Patented Oct. 23, 1951

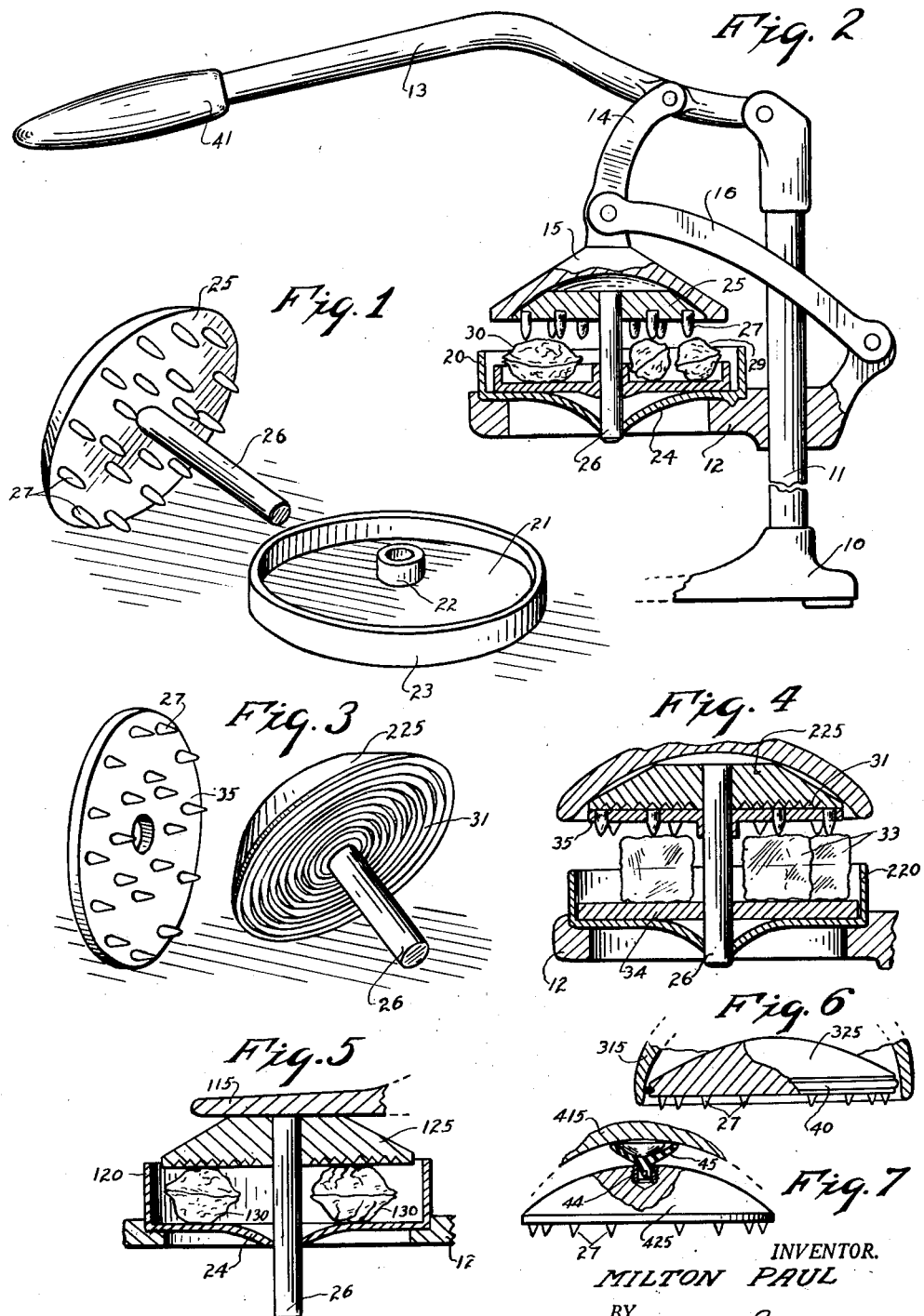

2,572,378

UNITED STATES PATENT OFFICE 2,572,378

NUTCRACKER AND ICE CRUSHER

Milton Paul, Great Neck, N. Y.

Application December 10, 1949, Serial No. 132,237

3 Claims. (Cl. 146—16)

This invention relates generally to preparation of certain food items and has particular reference to ice crushers and means which serve as nut crackers.

My present invention is disclosed in continuation in part of and with improvement of my copending application Serial No. 793,100, filed December 22, 1947, which became Patent No. 2,506,970 on May 9, 1950.

One of the objects of this invention resides in the provision of means for use with items of the above indicated character wherein the structures are simplified over and at the same time rendered more efficient than previous devices of like character.

More particularly stated the objects of this invention include provision of means of the indicated type, with which users thereof may prepare the food items more expeditiously, with greater ease, and with structures which, easy to assemble and operate, are likewise easy to keep in desirable working condition.

For other objects and for a better understanding of the invention, reference may be had to the following detailed description taken in connection with the accompanying drawing, in which Fig. 1 is a view in perspective of a pronged nut cracking member and tray.

Fig. 2 is a partly sectional elevational view of a nut cracking device constructed in accordance with this invention.

Fig. 3 shows in perspective a nut cracking or ice crushing pronged member together with a ribbed nut cracking member.

Fig. 4 is a fragmentary sectional view of ice crushing means incorporating the members of Fig. 3.

Fig. 5 shows sectionally a fragment of another nut cracking organization.

Figs. 6 and 7 show respectively fragments of other modifications of structure.

In said drawing, there is shown limited well known parts including a supporting base 10 with a vertical stem 11, on which is mounted a platform 12 with an open center and having a rearward extension. A handle 13 is pivoted on said stem and has thereon a depending magnetized ram 15, which may be cup-shaped, said ram or plunger having, pivoted on said handle, an arm 14, which latter connects by link means 16 with said extension.

Removably placed on the platform there is a cup-shaped carrier 20, there being an annular step for receiving the carrier, the disc of which has a projection as shown, fitting loosely into a recess in the platform. In said carrier, as shown in the embodiment of Figs. 1 and 2, there is a nut tray or disc 21, with a central sleeve 22 and boundary flange 23. The disc of the carrier 20 has a depending portion 24 in the opening of the platform 12, and this portion has therein an aperture.

A nut cracking unit with a head 25 of suitable metal is held by attraction in the ram 15, this head having a depending stem 26 movable in the aperture of said portion 24. Fixed in the head 25 there are prongs 27 spaced apart in such a way as to engage with ice cubes or nuts 30 of a certain large size, or smaller nuts 29. Thus, on operation of the handle 13, the shells of said nuts may be suitably cracked, downward movement being according to requirement, said handle having a terminal grip 41. If for any reason a shell is not sufficiently cracked, it may again be placed in the tray, the latter being removable if so desired with the cracked nuts, or they may be taken out separately by one's fingers.

Instead of cracking nut shells with the pronged head 25, a grooved head 125 may be used, as shown in Fig. 5, and in this case the tray member 23 may be omitted. The head 125 is similar to a head 225 of Figs. 3 and 4, said head having on its under face annular ribs 31 of increasing diameter from center to outer margin of the head. These ribs suitably engage nuts 130, which may be larger than those first named and in this case also the flange 120 of the cup carrier is deeper.

The showings of Figs. 3 and 4 are used as ice crushing members, ice cubes 33 being seen on a flat plate 34 within a carrier 220, said plate being apertured to receive the stem 26. Features of a crusher plate 35 are similar in part to those of the head 25, said features including prongs 27. The plate 35 of Fig. 4 has thereon a central collar at the stem 26, and this plate may be used for ice crushing in the same assembly with the head 225.

An arm 115 of Fig. 5, which arm may also be magnetized, serves the same purpose as the members 14 and 15 of Fig. 2, said arm 115 having an apertured end, not shown, movable on the stem 11, and there being pivotal connecting means, also not shown, between said arm and the handle 13.

Fig. 6 shows a modified arrangement in which, cooperating with a ram 315, not magnetized, there is a head 325 releasably held in the ram cup by a rubber ring 40, said head being grooved to receive the rings.

The device of Fig. 7 is partly similar to that of

Fig. 6. In Fig. 7, with a ram structure 415 there is a head 425 in a top threaded recess of which a ring 44 has pinned therein the shank of rubber suction cup 45, said cup cooperating attachingly with the head 415.

As the hereinbefore described construction admits of further modification without departing from the invention, the particular arrangements shown should be taken as illustrative, and not in a limiting sense; therefore, the scope of the protection contemplated is to be taken solely from the appended claims, interpreted as broadly as is consistent with the prior art.

I claim:

1. Nut cracking means for use with a fruit squeezer comprising a stem with a platform thereon and a handle pivoted on said stem, said platform having an open center and including a rear extension, said means including a magnetized ram of cup shape, the ram having an arm pivoted on said handle, link means connecting said arm and said extension, a nut tray having a disc supported on said platform, said disc having a depending center portion with an aperture in said open center, a deep annular ring rising from the outer margin of said disc, a nut cracker member having a metallic head attractable in the cup of said ram, said head having thereon prongs for engaging nuts, the latter being placeable on said disc, and a stem projecting from said head and movably disposed in said aperture.

2. Nut cracking means for use with a fruit squeezer comprising a stem with a platform thereon and a handle pivoted on said stem, said platform having an open center, said means including a ram of cup shape, the ram having an arm pivoted on said handle, a nut tray having a disc supported on said platform, said disc having a depending center portion with an aperture, a deep annular ring rising from the outer margin of said disc, a nut cracker member including a head, means holding said head in the cup of said ram, said head having thereon prongs for engaging nuts, the latter being placeable on said disc, and a stem projecting from said head and movably disposed in said aperture.

3. A device of the class described comprising in combination squeezer elements including a standard with a platform thereon and a handle pivoted on said standard, said platform having an open center and a rear extension, said device including a plunger of cup-shape, the plunger having an arm pivoted on said handle, an ice tray having a disc on said platform, said disc having a central aperture and including an outer boundary flange, an ice cracker member including a head, means attaching said head in the cup of said plunger, said head having a pronged surface for engaging ice on said tray, and a stem projecting from said head and movably disposed in said aperture.

MILTON PAUL.

REFERENCES CITED

The following references are of record in the file of this patent:

UNITED STATES PATENTS

| Number | Name | Date |
|---|---|---|
| D. 115,885 | Zurawin | July 25, 1939 |
| 281,378 | Kyser et al. | July 17, 1883 |
| 718,977 | Budesheim | Jan. 27, 1903 |
| 965,384 | Gebauer | July 26, 1910 |
| 1,968,264 | Rice | July 31, 1934 |
| 2,046,396 | Matter | July 7, 1936 |
| 2,116,756 | Goldblatt et al. | May 10, 1938 |

FOREIGN PATENTS

| Number | Country | Date |
|---|---|---|
| 54,133 | Sweden | Mar. 28, 1923 |
| 436,671 | Great Britain | Oct. 16, 1935 |
| 445,629 | Great Britain | Apr. 16, 1936 |
| 228,607 | Switzerland | Dec. 16, 1943 |